UNITED STATES PATENT OFFICE

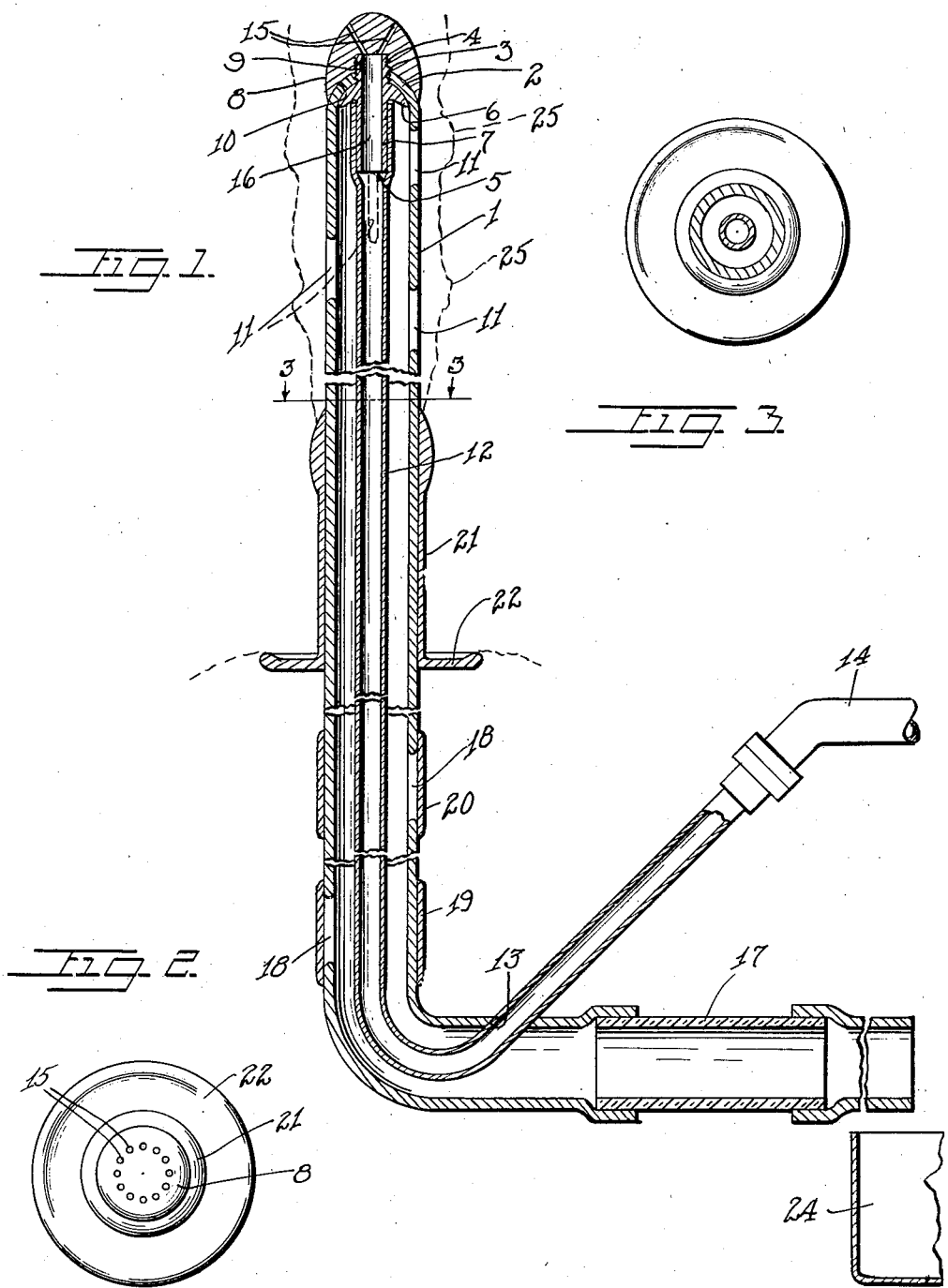

JOHN W. ONEILL, OF CHICAGO, ILLINOIS

IRRIGATION TUBE

Application filed March 29, 1929. Serial No. 351,102.

My invention relates to improvements in irrigation tubes, and it consists in the combinations, constructions, and arrangements herein described and claimed.

An object of my invention is to provide an irrigation tube which may be readily used for cleansing the interior of the stomach, but which is specially adapted to irrigate the colon and remove the bowel contents or fecal matter.

A further object of my invention is to provide a tube of the type described which is so constructed that it may be readily inserted in place.

A further object of my invention is to provide a tube of the type described which has a novel means for sealing the rectum around the tube.

A further object of my invention is to provide a tube of the type described which has a novel end construction whereby a liquid may be rapidly forced therethrough for the purpose intended without injuring the patient.

Other objects and advantages will appear in the following specification, and the novel features of the invention will be particularly pointed out in the appended claims.

My invention is illustrated in the accompanying drawings, forming part of this application, in which Figure 1 is a longitudinal sectional view of the tube, Figure 2 is an end view of the tube, and Figure 3 is a section along the line 3—3 of Figure 1.

In carrying out my invention I provide a relatively large flexible outer tube 1 preferably of soft rubber provided with an end 2 which is hemi-spherical in general contour. The end 2 is provided with an opening 3 which is arranged to receive the threaded end 4 of a short connection member 5, of hard rubber or the like.

The connection member 5 is provided with an annular abutting collar 6 which is disposed between the threaded end 4 and a tubular neck portion 7. A substantially conical shaped head portion 8 has an internally threaded portion or opening 9 which is arranged to receive the threaded end 4 of the connecting member. The head portion 8 is also provided with a concave recess 10 arranged to abut the end of the tube 1 so as to firmly hold the end 2 in place and prevent leakage.

The tube 1 is provided with staggered elongated openings 11 positioned in close proximity to the end 2. A relatively small tube 12 is disposed in the larger or outer tube 1 and has one end connected to the neck portion 7. The other end of the small or inner tube extends through the outer tube 1 at 13 and is connected to a fluid supply 14. The end of the tube 12 adjacent the neck 7 communicates with relatively small openings 15 in the head portion 8 by means of a passageway 16 provided in the connecting member. The inclined openings 15 extend from the passageway 16 and terminate in a circular arrangement.

A transparent tube 17 is positioned in the tube 1 for a purpose hereinafter described. Openings 18 are disposed in the tube 1 at desired positions and are arranged to be sealed by tubular sealing members 19 and 20 which are movably disposed upon the tube 1. A sealing sleeve 21 is movably disposed upon the tube 1 and is provided with an annular flange 22 at the outer end thereof.

In assembling the device, the inner tube 2 is passed through the opening 13 and thence to the end of the rubber tube 1. The end of the inner tube may be drawn through the opening 11 and the connecting member 7 is fitted to the inner tube and then is passed into the interior of the outer tube 1 and the threaded portion is worked up through the opening 3. The head 2 is then fastened on the threaded portion. The transparent connecting member 17 may then be placed in position and the connection 14 to the water supply is made.

From the foregoing description of the various parts of the device, the operation thereof may be readily understood. Let us assume that the device is to be used to irrigate the colon. The end carrying the head portion 8 is inserted into the colon through the rectum and may be passed through the descending colon, around the splenic flexure, through the transverse colon, past the hepatic flexure, and downwardly into the ascending colon, the device being flexible.

As the head portion 8 is passed through these portions of the colon a fluid, such as water and containing certain chemicals if desired, is forced through the inner tube 12 from the fluid supply 14. The fluid from the tube 12 is forced through the passageway 16 and then forced in inclined directions through the openings 15. The fluid in passing from the head portion will contact with the inner wall of the colon with sufficient force to remove all fecal matter thereon without injuring the patient. As the fecal matter is removed it is carried, with the fluid that is used to remove it, through the openings 11 and into the tube 1. The fluid and fecal matter will be passed through the tube 1 and through the transparent member 17 and into a receptacle 24.

The operator can observe the fluid passing through the transparent member and as long as it carries fecal matter with it the tube is retained at that position. As the wall of the colon becomes cleansed the tube is gradually moved inwardly as far as possible. The force of the fluid will remove fecal matter or bowel contents even from the various recesses or pockets such as those indicated at 25.

During the use of this instrument the fluid could be as warm as desired. The sealing sleeve 21 is inserted into the rectum for insulating the outer tube 1 from the wall of the rectum. This sleeve also seals against leakage of the fluid except through the tube 1. The purpose of the openings 18 is to provide an outlet for the fluid that has not passed through the openings 11 after the instrument has been passed upwardly a considerable distance in the colon. The members are to seal the openings 18 while the openings are positioned outside the rectum.

The openings 15 are to be of such a size that the fluid may be forced therethrough quite rapidly without causing the patient suffering. As a matter of fact the openings 15 are so small that if the stream of fluid were directed into a wound thus cleansing it the patient would not be caused any additional suffering.

I claim:

1. A syringe nozzle comprising an outer tube having a hemispherical end provided with an opening, a head having a hemispherical recess arranged to fit on the hemispherical end and being provided with outlet openings, an inner tube, a connecting member having a threaded attachment with said head and being provided with curved flange portions arranged to bear against the inner walls of the hemispherical end portion of the head, said connecting member being arranged to enter the inner tube, said outer tube being provided with openings near the head portion, and means for supplying a liquid to the inner tube.

2. A syringe nozzle comprising an outer tube having an end provided with an opening, a head adapted to fit on the end of said outer tube and provided with outlet openings, an inner tube, a connecting member having a threaded attachment with said head and provided with a flange portion arranged to bear against the inner wall of the end portion of the head, said connecting member being arranged to enter the inner tube, said outer tube being provided with openings adjacent the end thereof, and means for supplying a liquid to the inner tube.

Signed at Chicago, in the County of Cook, and State of Illinois, this 23rd day of March, A. D. 1929.

JOHN W. ONEILL.